July 3, 1928.  
J. L. DAVIS  
1,676,136  
BRAKE ATTACHMENT FOR MOTOR VEHICLES  
Filed June 10, 1927   2 Sheets-Sheet 1

James Lewis Davis  
INVENTOR  
BY *Victor J. Evans*  
ATTORNEY

WITNESS:

July 3, 1928.

J. L. DAVIS 1,676,136

BRAKE ATTACHMENT FOR MOTOR VEHICLES

Filed June 10, 1927  2 Sheets-Sheet 2

James Lewis Davis
INVENTOR
BY Victor J. Evans
ATTORNEY

WITNESS:

Patented July 3, 1928.

1,676,136

UNITED STATES PATENT OFFICE.

JAMES LEWIS DAVIS, OF ADRIAN, MISSOURI.

BRAKE ATTACHMENT FOR MOTOR VEHICLES.

Application filed June 10, 1927. Serial No. 197,933.

This invention relates to an improvement in the brake means of motor vehicles, the general object of the invention being to provide means whereby the brake pedal will operate the brakes of the rear wheels as well as the transmission brakes, so that it is not necessary to operate the hand lever in order to apply the wheel brakes.

Another object of the invention is to so arrange the hand lever that the controller shaft can be actuated from the brake pedal without manipulating the hand lever.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
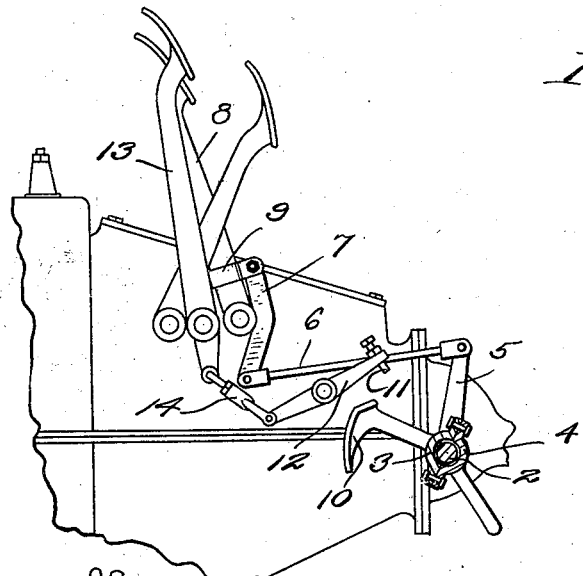
Figure 1 is a section on line 1—1 of Figure 2 showing the exterior parts of the transmission means of a motor vehicle, with the invention attached thereto.
Figure 2:
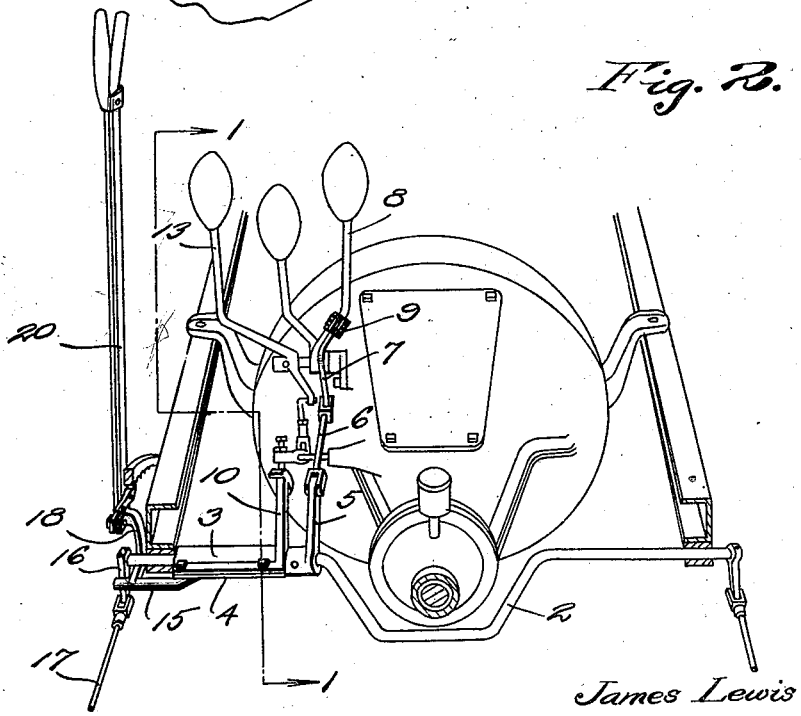
Figure 2 is a perspective view of Figure 1, but showing the hand lever and the parts associated therewith.
Figure 3:
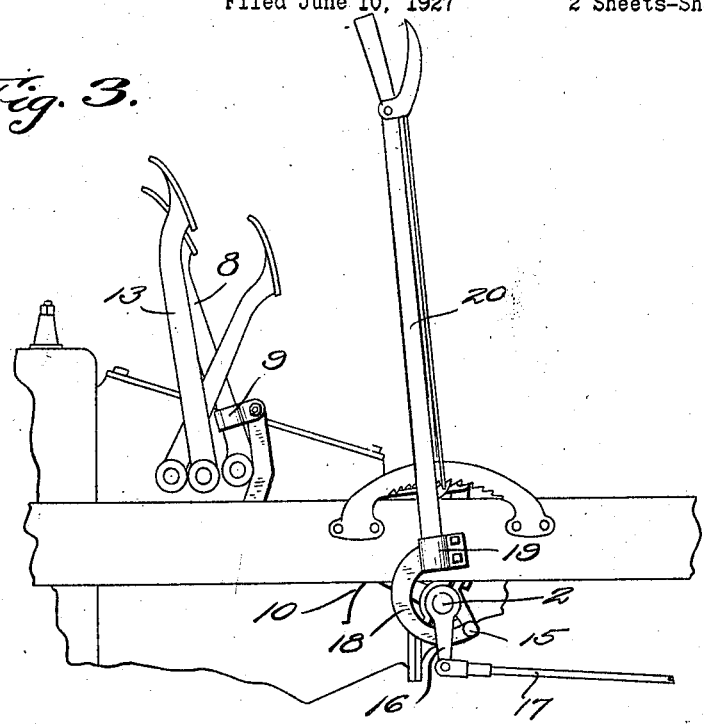
Figure 3 is a side view of the transmission means, a part of the chassis and the hand lever and its associated parts.
Figure 4:
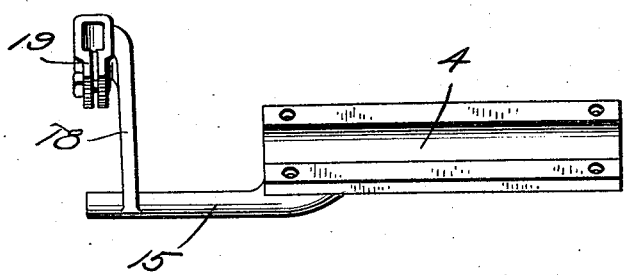
Figure 4 is a view of the bottom part of the rotary member mounted on the controller shaft, with means for attaching the hand lever thereto.

As shown in these views, I remove the cam or speed lever from the controller shaft 2 and rotatably arrange on a part of said shaft a member which is composed of an upper part 3 and a lower part 4, each part being of semi-circular form with a flange at each edge thereof, and the flanges of the two parts being bolted or otherwise fastened together.

I also fasten an arm 5 to the shaft, and this arm is connected by a link 6 with a bent bar 7 which is fastened to the brake pedal 8 by a clamp 9. These parts are so arranged that when the pedal is depressed, the bar 7 will force the link 6 rearwardly and thus cause the arm 5 to partly rotate the controller shaft 2 and thus apply the brakes of the rear wheels. The upper part 3 of the rotary member has connected therewith the cam or speed lever 10 which engages the bolt 11 carried by the lever 12 which is connected with the lower end of the clutch pedal 13 by the link 14, so that when the cam of lever 10 is in engagement with the bolt 11, the clutch pedal will be depressed to release the clutch in the usual manner.

An arm 15 is connected with the lower part 4 of the rotary member and extends under the left hand bearing of the shaft 2 and this arm also extends in rear of the arm 16 on shaft 2 which is connected with the left hand brake rod 17. A curved arm 18 is connected with the arm 15 a slight distance from its free end, said arm being arranged at right angles to the arm 15, and this arm 18 carries a clamp 19 which receives the lower end of the hand lever 20 which is cut off so that it is not attached to the shaft 2.

From the foregoing it will be seen that when the hand lever is pulled toward the driver, the projecting end of arm 15, engaging the arm 16 of shaft 2, will rock said shaft and thus apply the wheel brakes in the usual manner, and the rotary movement imparted to the members 3 and 4 will cause the lever 10 to disengage the clutch. It will also be seen that when the brake pedal is depressed, the shaft 2 will be rocked to apply the brakes on the rear wheels as well as the brake of the transmission and this can be done without releasing the clutch. Thus I have provided means whereby both brakes will be applied through means of the brake pedal without disengaging the clutch, while permitting the hand lever to be used to disengage the clutch and apply the brakes of the rear wheels.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In a motor vehicle including a controller shaft, arms connected with the shaft, brake rods connected with the arms, a brake pedal, a clutch pedal and a hand lever, an arm connected with the controller shaft, a bar clamped to the brake pedal, a link connecting the bar with the last mentioned arm so that the depression of the pedal will rock the shaft to apply the wheel brakes, a rotatable member on the controller shaft, a cam or speed lever carried thereby for engaging the clutch pedal operating means to release the clutch when the member is rotated, an arm on said rotary member extending in rear of one of the brake rod arms on the controller shaft to rock the shaft when the member is rotated to apply the wheel brakes, a second arm attached to the arm on the rotary member and a clamp on the second arm for engaging the hand lever which is separated from the controller shaft.

In testimony whereof I affix my signature.

JAMES LEWIS DAVIS.